May 23, 1933. M. ZAIGER ET AL 1,910,211
REGISTRATION PLATE HOLDER FOR AUTOMOBILES
Filed Feb. 20, 1933 3 Sheets-Sheet 1
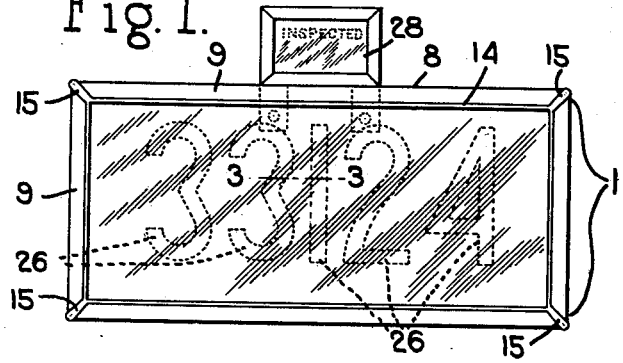
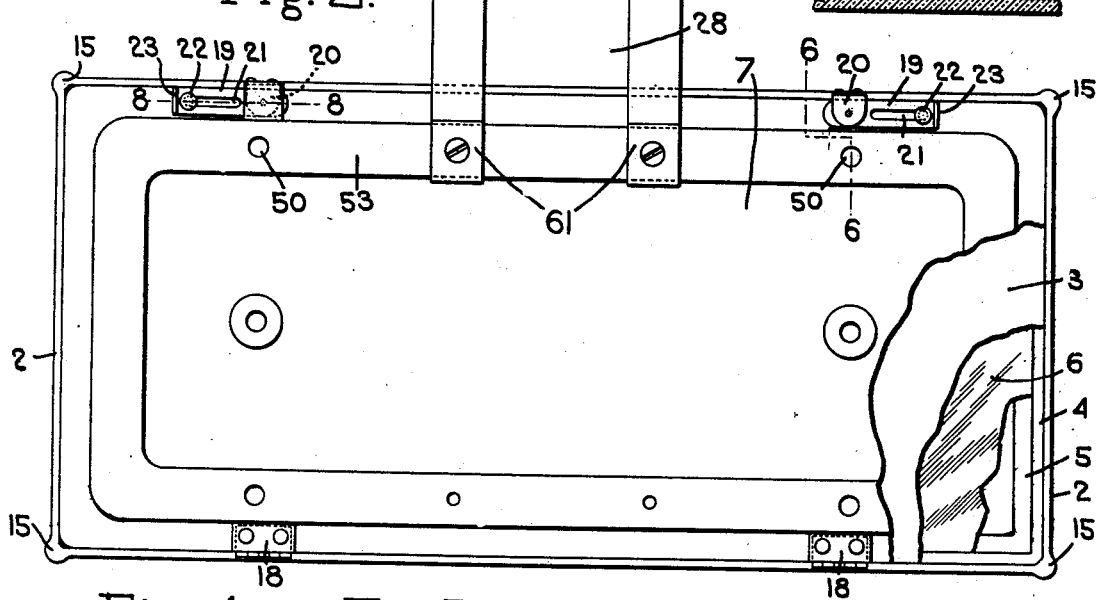
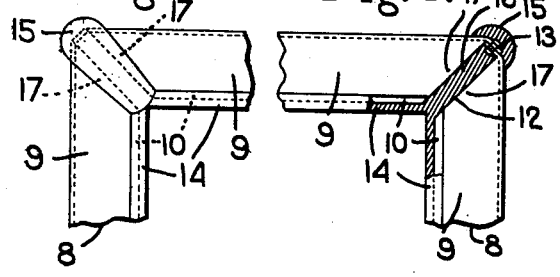
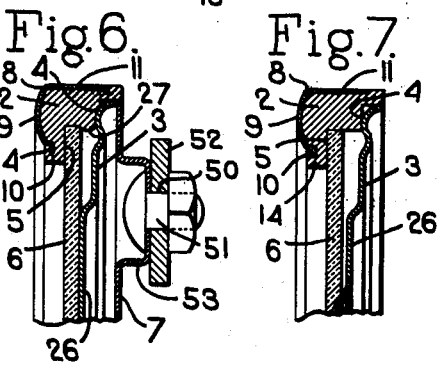
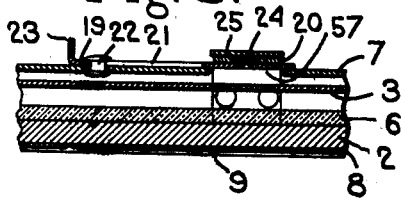
Inventors.
Max Zaiger
Louis Zaiger
by Heard Smith & Tennant
Attys.

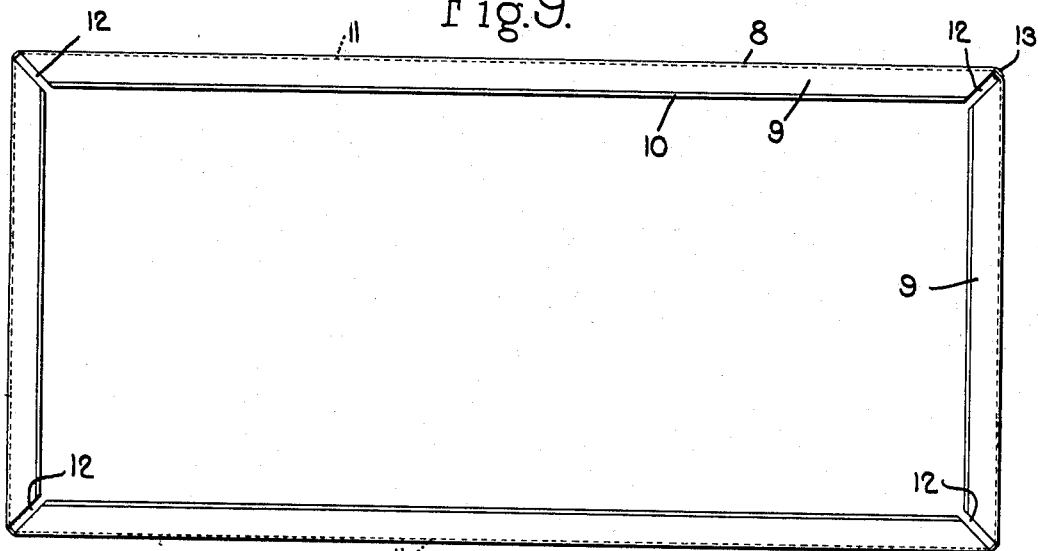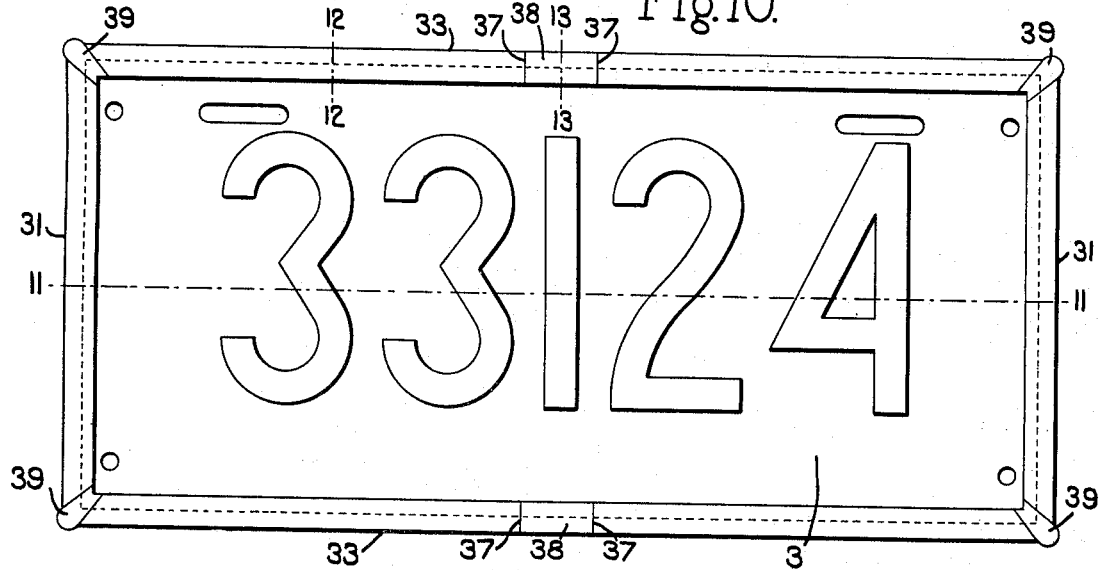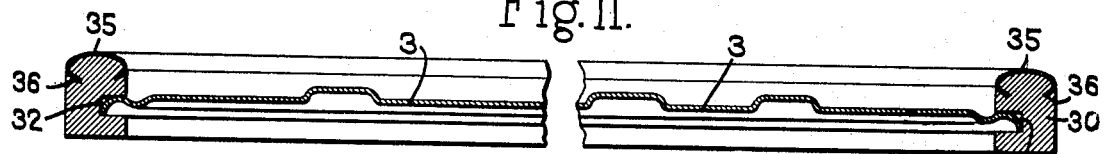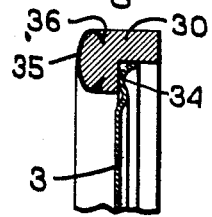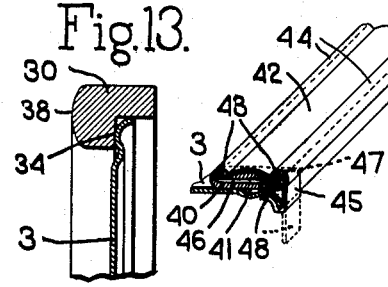

May 23, 1933.   M. ZAIGER ET AL   1,910,211
REGISTRATION PLATE HOLDER FOR AUTOMOBILES
Filed Feb. 20, 1933   3 Sheets-Sheet 3
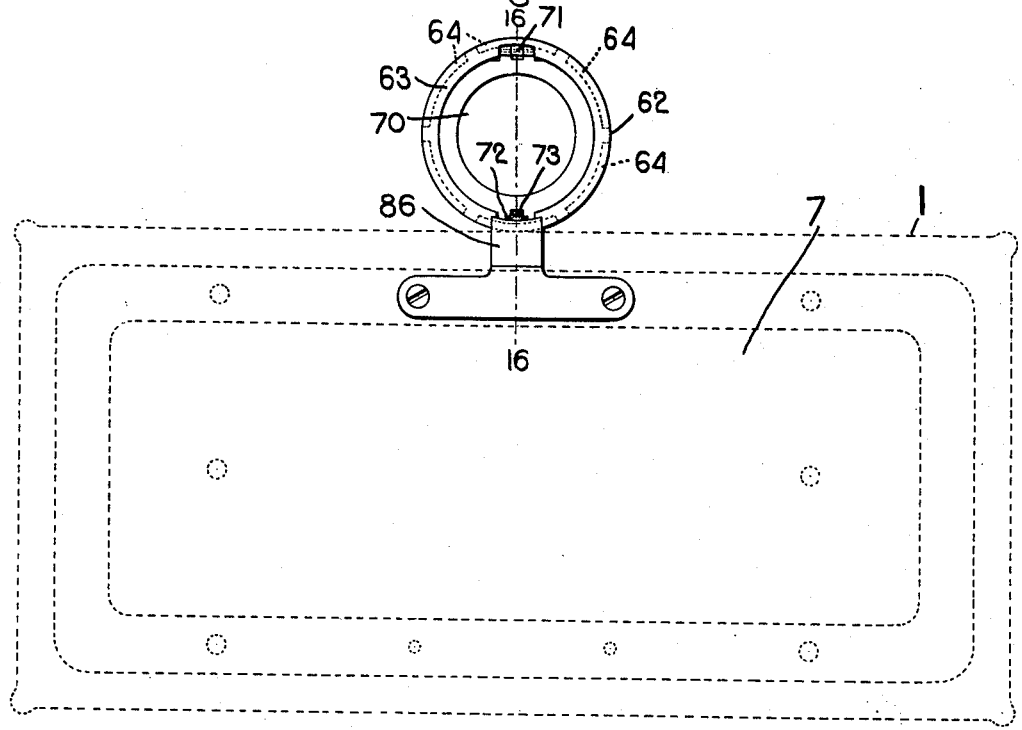
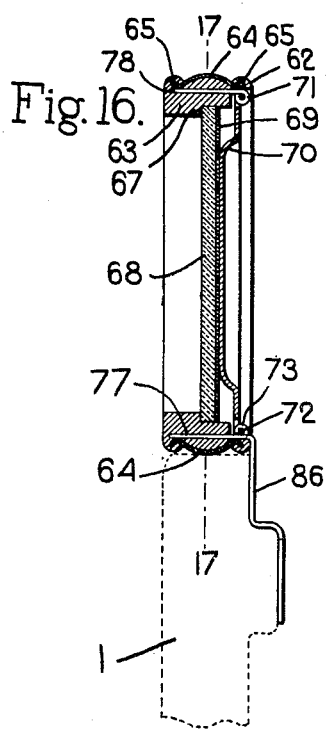
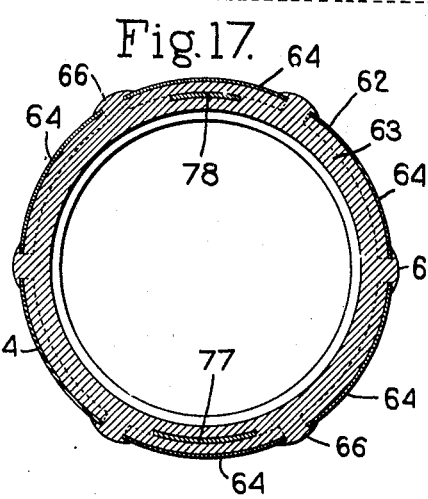
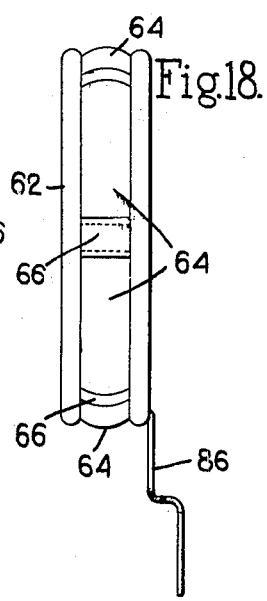
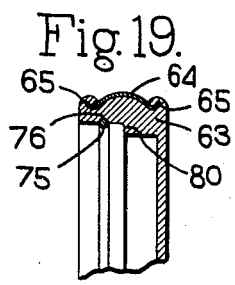
Inventors.
Max Zaiger
Louis Zaiger
by Heard Smith & Tennant.
Attys.

Patented May 23, 1933

1,910,211

UNITED STATES PATENT OFFICE

MAX ZAIGER, OF SWAMPSCOTT, AND LOUIS ZAIGER, OF LYNN, MASSACHUSETTS

REGISTRATION PLATE HOLDER FOR AUTOMOBILES

Application filed February 20, 1933. Serial No. 657,504.

This invention relates to registration plate holders for motor vehicles and it has for one of its objects to provide a novel plate holder in which the body portion of the plate holder is made of rubber molded to the desired shape to enclose the registration plate and to provide a seat for receiving the edges of the plate, which body portion of rubber has molded into it one or more metal strips that are exposed on the surface of the body and thereby serve not only to stiffen or reinforce the rubber frame or holder but also to give it an ornamental appearance.

Another object of the invention is to provide an improved registration plate holder which is constructed so that there will be a rubber-to-glass contact only as between the glass and the frame of the holder thereby providing a structure in which the glass is cushioned.

In order to give an understanding of the invention we have illustrated in the drawings some selected embodiments thereof which will now be described after which the novel features will be pointed out in the appended claims.

Fig. 1 is a front view of a registration plate holder showing a registration plate therein;

Fig. 2 is a rear view thereof with parts broken out;

Fig. 3 is an enlarged section on the line 3—3, Fig. 1;

Fig. 4 is a fragmentary view showing one corner of the plate holder;

Fig. 5 is a fragmentary view showing another corner with parts broken out;

Fig. 6 is a section on the line 6—6, Fig. 2;

Fig. 7 is a section similar to Fig. 6 but showing the parts with the registration plate and glass assembled in the frame but before they are locked in the frame;

Fig. 8 is an enlarged section on the line 8—8, Fig. 2;

Fig. 9 is a view of the metal-reinforcing member shown in Fig. 1 which is molded into the rubber;

Fig. 10 is a front view of a registration plate holder embodying our invention but having a different construction from that shown in Figs. 1 to 9;

Fig. 11 is an enlarged section on the line 11—11, Fig. 10 with parts broken out;

Fig. 12 is an enlarged section on the line 12—12, Fig. 10;

Fig. 13 is an enlarged section on the line 13—13, Fig. 10;

Fig. 14 is a fragmentary sectional perspective view showing a still different embodiment of the invention;

Fig. 15 is a view showing a different embodiment of the invention;

Fig. 16 is an enlarged section on the line 16—16, Fig. 15;

Fig. 17 is a section on the line 17—17, Fig. 16;

Fig. 18 is a side view of the inspection tag holder;

Fig. 19 is a fragmentary sectional view showing a different embodiment of the invention.

The registration plate holder shown in Figs. 1 to 9 is of the type which is designed to hold not only the registration plate but also a glass front to cover the front of the plate. The type of plate holder shown in Figs. 10 to 13 is one which serves merely to hold the registration plate without the glass covering the plate.

The plate holder shown in Figs. 1 to 10 is formed with a skeleton framework indicated generally at 1 which is made with a body of rubber molded into the desired shape thereby to provide a seat for the glass and also a seat for the registration plate, said body of rubber having molded into it one or more metal strips which serve not only to reinforce and stiffen the body portion but which also give the plate holder an ornamental appearance.

The body of rubber is so shaped that when the glass and the registration plate are assembled in the frame there will be a glass-to-rubber contact only between the glass and the frame. This arrangement eliminates the possibility of rattle and also provides a cushion for the glass which will prevent it becoming broken by vibration.

The rubber body portion of the holder is indicated at 2 and it is molded in the form of a skeleton frame arranged to encircle the number plate 3 and it has the cross-sectional shape shown in Fig. 7. Said body portion 2 is molded to present a seat 4 on its rear face to receive the edge of the registration plate 3 and it is also molded to form another seat 5 designed to receive the glass 6 which covers the registration plate, the inside face of the rubber body portion 2 is thus molded to form the two steps 4 and 5 that constitute the seats for the registration plate and the glass respectively.

The registration plate and glass are held in the frame or holder by means of a rear door or cover 7, the construction of which will be more fully hereinafter described.

The rubber body 2 has molded in it one or more strips of metal which are exposed on the front face of the body and which serve not only to reinforce and stiffen it but also to give an ornamental appearance. One way of providing this reinforcement is to use a metal-reinforcing member 8 having the construction shown in Figs. 6 and 9. This reinforcing member shown in Fig. 9 is in the form of a skeleton frame having the same rectangular shape as the holder 1 and it has a general L shape in cross section, said member 8 having the curved front wall 9 which is offset at its edge 10, and also having the side wall 11 which extends at right angles to the general plane of the front wall 9. The front face 9 of this rectangular reinforcing member 8 is cut away at the corners as shown at 12 thereby leaving slots or openings in the front face at the corners.

This member may be conveniently made from a strip which is bent to give it the correct cross-sectional shape and which is cut away at the places where the corners are to occur and then bending the strip into the rectangular shape shown in Fig. 9 and securing the ends of the strip together by spot welding or rivets as shown at 13.

In molding the registration plate holder the metal-reinforcing member 8 will be placed in the mold and then the rubber will be deposited in the mold and the two parts of the mold which are relatively so shaped as to produce the completed frame with the cross section shown in Fig. 7 are brought together to perform the molding operation. The shape of the mold will be such as to allow the rubber to flow around the lip 10 as indicated at 14 so that in the completed article said lip 10 is embedded in the rubber.

The mold is also preferably provided with pockets or recesses at the corner so that when the molding operation is performed the rubber will flow into these recesses to produce the corner ribs 15 of the frame. The rubber, of course, also flows through and fills the slots 12 shown in Fig. 9 so that in the completed article the ribs of rubber 15 at the corners enclose the edges 17 of the front face 9 of the metal frame, the frame or plate holder, therefore, has a rubber body which presents the seats 4 and 5 to receive the registration plate and the glass and it has the metal member 8 which is molded into it and which is exposed on the front and side faces of the rubber body thereby giving an ornamental appearance and also importing a stiffness or rigidity into the plate holder.

The plate holder will present on its front face a rim of rubber bordering the inside of the metal member 8 where the rubber flows over the lip 10 as shown at 14 and it will also present the corner ribs 15 which extend from the inner rim 14 of rubber around the corners to the back, the ribs 15 being integral with the rim 14 on one end and being integral with the rubber of the body at the back face thereof.

We have stated above that the registration plate and the glass are retained in position by a rear door or cover 7. This cover is shown as hinged to the side wall 11 of the metal member 8 by means of two hinges 18. This door or cover is locked closed in any suitable way. As herein shown said door or cover is provided with two sliding latches 19 which are adapted to be thrust under locking lips or keepers 20 that are secured to the side edge of the member 8 at the top. These latches 19 are shown as provided with slots 21 in which are received guiding studs 22 carried by the door or cover 7 and each latch is upturned at its end as shown at 23 to provide a finger hold by which the latch may be operated.

When the ends of the latches are confined beneath the keepers 20 the door or cover 7 will be locked thus retaining the registration plate 3 and glass 6 in place. By withdrawing the latches from beneath the keepers 20 the door is unlocked and can be swung open to remove the registration plate or the glass.

Each keeper is shown as having the projection 24 struck up therefrom which is adapted to enter a notch or recess 25 formed in the keeper 20. These projections 24 and notches 25 serve to frictionally hold the latches in their operative position. 88 represent portions of the cover 7 which are struck up therefrom thereby forming the opening 57 therein. These portions 88 overlie the keepers 20 and conceal them as shown at the left in Fig. 2. The portion 88 for the right hand keeper 20 in Fig. 2 is broken out and hence does not appear in said figure.

The numbers on the registration plates 3 are usually formed by deforming the plate so that the portions 26 constituting the numbers on the plate are raised from the front surface of the plate and such raised surfaces are usually painted so that they will have a color contrasting with the background.

In forming the improved frame 2 we propose to so mold it that the space between the seats 4 and 5 is slightly greater than the combined thickness of the glass and extent to which the portions 26 of the plate are raised to produce the numbers. With this arrangement when the registration plate is placed against its seat 4 the raised surface 26 of the numbers will be spaced slightly from the glass as shown in Fig. 7.

When the cover 7 is closed the registration plate will be crowded firmly against its seat and will be moved inwardly a sufficient distance to bring the raised portions 26 thereof against the glass 6 as shown in Fig. 6. During this operation of forcing the edge of the registration plate 3 against its seat 4 the rubber of the body portion will give somewhat and will be crowded against and partially over the edge of the glass as shown at 27 in Fig. 6 thereby providing means for firmly holding the glass in place. There is, therefore, a rubber-to-glass contact only around the edge of the glass.

In Figs. 10 to 13 we have shown a different embodiment of the invention. In said different embodiment the registration plate holder is designed to hold the registration plate only and no glass is used.

The registration plate holder comprises a body portion 30 of rubber or other moldable material which is of rectangular shape and designed to enclose the registration plate 3. The ends 31 of the frame are provided on their inner faces with grooves 32 in which the edges of the registration plate are received and the sides 33 are each molded so as to present a shoulder or seat 34 against which a long edge of the registration plate 3 rests.

The ends and the sides of the body 30 have molded into them metal strips 35 which cover the front face of the body and give it an ornamental appearance. The edges 36 of these metal strips are embedded in the rubber. These strips may be placed in the mold which is used in molding the rubber body 30 so that when the molding operation is performed the rubber will be molded about the edges 36. These metal strips are shown as extending across the short sides or ends and along the long sides of said holder from each end nearly to the middle.

As shown in Fig. 10 the metal extends from each end along each side to the point 37 and as a result there will be a short section 38 of each long side of the rubber body 30 and which is free from the metal reinforcing member. This provides a frame which is flexible in its central portion but one which has the same ornamental appearance as the number plate holder shown in Fig. 1. In this embodiment of the invention also the number plate holder is molded with corner ribs 39 at each corner which correspond to the ribs 15 in Fig. 1.

The registration plate and the holder shown in Figs. 10 to 13 are assembled by first inserting one end edge of the registration plate in the groove 32 on one end of the frame and then applying sufficient pulling strain in the direction of its length so as to permit the other end to be worked over the corresponding edge of the registration plate and said edge to be worked into the groove 32. When the plate is in position in the holder its ends are confined in the grooves 32 and the long side edges are resting against the seats 34.

In Fig. 14 we have shown another embodiment of the invention which may be used without the glass. In this embodiment the rubber or molded body of the holder is indicated at 40 and it is formed with the seat portion 41 to receive the edge of the registration plate 3. This body is also preferably provided with metal trim which is secured by molding into the front face of the body a sheet metal member 42 and in so doing the edges 43 of the sheet metal member are preferably embedded in and enclosed by the rubber or other moldable material.

This member 42 is shown as having a convex center portion and the edges 43 are reversely curved. The molding of this metal member 42 into the body is done in such a way that the central convex face of the member is exposed and the front face of the registration plate holder will thus show the metal member with the beading 44 of rubber either side thereof, this beading being the portion of the rubber which encloses the edges 43 of the metal member.

While any suitable means may be employed for clamping the registration plate 3 against the seat 41 yet in Fig. 14 there are shown metal tabs or ears 45 which are anchored in the body member and which can be bent over to embrace the back side of the registration plate as shown in full lines Fig. 14.

Any desired number of these clips may be employed. Each clip is shown as made from an L-shaped piece of metal, one arm 46 of which is riveted or otherwise secured to the sheet metal member 42 as indicated at 47.

When the frame is made the arm 48 of each clip extends at right angles to the seat 41.

The clips are made of sufficiently ductile material to permit them to be bent over into contact with the back face of the registration plate 3 and they thereby act to clamp the plate 3 firmly to its seat.

In some States there is a requirement that motor vehicles should be periodically inspected to see that they are in proper condition for use. In Fig. 1 we have shown at 28 a supplemental frame adapted to hold a tag or ticket such as is required in some localities, such for instance as a city license tag or an inspection certificate to show that the motor vehicle has been properly inspected.

The frame 28 shown in Fig. 1 is rectangular in shape and is secured to the back cover 7 of the registration plate holder and is provided with arms 61 that are secured to the channel portion 53 with which the back cover 7 is provided. This channel portion is shown as having apertures 50 therein to receive bolts 51 by which the number plate holder can be secured to a registration plate supporting bar 52 with which the motor vehicle is equipped.

In Figs. 15 to 19 we have shown a different embodiment of the invention wherein this supplemental frame is curvilinear in outline and is made with a body portion of rubber in which are molded metal strips to stiffen the rubber and to furnish a suitable ornamental appearance the same as in the registration plate holders above described.

Fig. 15 is a rear view of a registration plate holder having an improved form of supplemental frame supported thereby, the registration plate holder in said Fig. 15 being similar to that shown in Fig. 2. The supplemental frame is indicated at 62 and it is herein shown as circular in shape. It is formed of a body portion 63 of rubber in which is molded a plurality of sheet metal plates or members 64 which are similar in cross-sectional shape to the sheet metal members shown in Fig. 14.

Each sheet metal member 64 has its edges 65 embedded in and enclosed by the rubber of the body 63. There are a plurality of such metal members 64 extending around the periphery of the body portion 63, said members 64 being arranged end to end but with a space between the adjacent ends of adjacent members. At these spaces the body member 63 may be provided with transverse ribs 66 of rubber which enclose the ends of the plates 64. These plates or members 64 thus serve to stiffen the annular frame but allow certain flexibility between the adjacent ends of adjacent members. The body 63 is shown in Fig. 16 as molded with a seat portion 67 to receive glass 68.

69 indicates the tag or certificate or the like which is to be carried by the supplemental frame 62.

The glass 68 and certificate 69 are held in place by means of a door or cover 70 which is shown as hinged to the frame at 71. The door or cover is shown as being held closed by a locking pin 72 which is inserted through an eye 73 that is struck up from a plate 77 that is molded in the body 63, the ends of said pin engaging the cover and holding it in place.

Another way of holding the glass 68 and the certificate, tag or the like 69 in place is shown in Fig. 19 wherein the body 63 is molded with a seat portion 80 at the rear face against which the tag, certificate 69 or the like rests. The glass 68 is placed on top of the certificate and may be held in place by a split ring 75 which is partially received in a groove 76 formed in the body portion.

The supplemental frame 62 is attached to the registration plate holder by any suitable means. We have shown herein for this purpose a bracket arm 86, the upper end of which extends laterally as shown at 77 and is embedded or molded in the body 63 of the frame. The hinge 71 is shown as a hinge member 78 in the form of a plate which is molded in the body 63. Both the hinge member 78 and the offset end 77 of the bracket arm 86 may, if desired, be rivetted or spot welded to one of the reinforcing members 64.

While we have shown this frame with curvilinear outline made of a body of moldable material such as rubber having the reinforcing plates molded into it both for the purpose of stiffening it and for giving the frame an ornamental appearance, as used for a frame to carry an inspection tag, license tag or the like, yet the same construction might be embodied in a frame adapted for other uses, and hence we do not wish to be limited to the use of a frame of this construction for the purposes above illustrated.

We claim:

1. A registration plate holder for motor vehicles comprising a rectangular body of moldable material adapted to surround an automobile registration plate and having a seat portion to receive the edges of said plate, and a sheet-metal reinforcing member molded to the body and having an edge embedded in and enclosed by the material of the body, a portion of said reinforcing member being exposed on the surface of said body.

2. A registration plate holder for automobiles comprising a rectangular body of moldable material adapted to surround an automobile registration plate and having a seat portion to receive the edges of said plate, and a rectangular sheet metal reinforcing member molded to the body, certain edges of said reinforcing member being embedded in and enclosed by the material of the body and said member being exposed on the front face of the body.

3. A registration plate holder for automobiles comprising a rectangular body of moldable material adapted to surround an automobile registration plate and having a seat portion to receive the edges of said plate, and a rectangular sheet metal reinforcing member molded to the body, certain edges of said reinforcing member being embedded in and enclosed by the material of the body and said member being exposed on and enclosing the front and outside faces of said body.

4. A registration plate holder for automobiles comprising a rectangular body of moldable material adapted to surround an automobile registration plate and having a seat portion to receive the edges of said plate, and a rectangular sheet metal reinforcing member molded to the body, the inner edge of said member being embedded in and enclosed by the material of the body, said member being exposed on the front face of said body.

5. A registration plate holder for automobiles comprising a rectangular body of moldable material adapted to surround an automobile registration plate and having a seat portion to receive the edges of said plate, a sheet metal reinforcing member molded to the body and having an edge embedded in and enclosed by the material of the body, a portion of said reinforcing member being exposed on the surface of said body, and means to clamp the registration plate against said seat portion.

6. A registration plate holder for automobiles comprising a rectangular body of moldable material adapted to surround an automobile registration plate and having a seat portion to receive the edges of said plate, a sheet metal reinforcing member molded to the body and having an edge embedded in and enclosed by the material of the body, a portion of said reinforcing member being exposed on the surface of said body, and a clamping member hinged to the reinforcing member and adapted to clamp the registration plate against the seat portion.

7. A registration plate holder for automobiles comprising a rectangular body of moldable material adapted to surround an automobile registration plate and having a seat portion to receive the edges of said plate, a sheet metal reinforcing member molded to the body and having an edge embedded in and enclosed by the material of the body, a portion of said reinforcing member being exposed on the surface of said body, and a clamping member in the form of a rear cover hinged to the reinforcing member and adapted to clamp the registration plate against said seat portion, said clamping member when in operative position closing the back of the body.

8. A holder for an automobile registration plate comprising a rectangular body of moldable material adapted to surround an automobile registration plate, said body having a glass-receiving seat portion and a plate-receiving seat portion, the glass-receiving seat being in front of the plate-receiving seat, a glass resting against the glass-receiving seat, an automobile registration plate resting against the plate-receiving seat, means to clamp said plate to its seat, and a sheet metal reinforcing member molded to said body and having an edge thereof embedded in and enclosed by the material of said body, said reinforcing member being exposed on the exterior surface of the body.

9. A holder for an automobile registration plate comprising a rectangular body of resilient moldable material adapted to surround said plate, said body having a glass-receiving seat portion and a yielding plate-receiving seat portion, a glass resting on the glass-receiving seat portion, a registration plate resting on the plate-receiving seat portion, said registration plate having raised figures facing the glass, means to clamp the edges of said plate against the plate-receiving seat portion with sufficient pressure to cause the latter to yield and to bring the raised figures against the glass.

10. A device of the class described having a body portion of moldable flexible material, sheet metal reinforcing members molded to said body portion, an edge of each member being embedded in and enclosed by the material of the body portion, and said members extending from opposite ends of the body portion toward the center, and being exposed on the surface of the body member.

11. A device of the class described having a body portion of moldable flexible material, sheet metal reinforcing members molded to said body portion, an edge of each member being embedded in and enclosed by the material of the body portion, and said members extending from opposite ends of the body portion toward the center, and being exposed on the surface of the body member, the central portion of the body member being free from reinforcing plates thereby being flexible.

12. A holder for an automobile registration plate comprising a rectangular body of moldable material adapted to surround an automobile registration plate, said body having a glass-receiving seat portion and a plate-receiving seat portion, the glass-receiving seat being in front of the plate-receiving seat, a glass resting against the glass-receiving seat, an automobile registration plate resting against the plate-receiving seat, and means to clamp said plate to its seat.

13. A holder for a motor vehicle registration plate comprising a rectangular body of resilient moldable material adapted to surround said plate, said body having a glass-receiving seat and a yielding plate-receiving seat, a glass resting on the glass-receiving seat, a registration plate resting on the plate-receiving seat, means to clamp the edges of the plate against said plate-receiving seat with sufficient pressure to cause the latter to yield and to press the material of the body portion against the edges of the glass.

14. A registration plate holder for motor vehicles comprising a rectangular body adapted to surround a registration plate and having a glass-receiving seat and a plate-receiving seat, a glass having its edges resting against the glass-receiving seat, a registration plate having its edges resting against the plate-receving seat, and means to clamp said plate and glass to their seats, the entire portion of the holder against which the edges of the glass contact being of rubber whereby there is a rubber-to-glass contact only at the edge of the glass.

15. A frame having a curvilinear shape and comprising a body of moldable material and a plurality of sheet metal reinforcing members molded into the body at its periphery and having portions thereof exposed on the surface of the body, the edges of the reinforcing member being embedded and enclosed by the material of the body.

16. A frame having a curvilinear shape and formed with a body of moldable material and a plurality of sheet metal reinforcing plates arranged about the periphery of the body in end-to-end relation and molded into said body, portions of each plate being exposed on the surface of the body, and each plate having some of its edges embedded in and enclosed by the material of the body.

17. A frame having a curvilinear shape and comprising a body of moldable material and a sheet metal reinforcing member molded into the body and having a portion of its surface exposed on the surface of the body, some of the edges of the reinforcing member being embedded in and enclosed by the material of the body.

In testimony whereof, we have signed our names to this specification.

MAX ZAIGER.
LOUIS ZAIGER.